United States Patent Office.

HERMANN ENDEMANN, OF NEW YORK, N. Y.

Letters Patent No. 103,728, dated May 31, 1870.

IMPROVEMENT IN PREPARING AND PRESERVING MEAT.

The Schedule referred to in these Letters Patent and making part of the same.

*To all whom it may concern:*

Be it known that I, HERMANN ENDEMANN, of the city, county, and State of New York, have invented a new and useful Improvement in Preserving and Preparing Meat; and I do hereby declare the following to be a full, clear, and exact description thereof, which will enable those skilled in the art to make and use the same.

This invention relates to a process for preserving and preparing meat by first freeing it from fat, then drying it in a suitable oven or kiln at a heat below 140°, or at a temperature below the point at which the albumen, fibrin, and other like substances become insoluble in the acids of the stomach; and, finally, reducing said dried meat to a fine powder, in which state it is ready for the market.

In carrying out my invention I first free the meat from the large masses of fat, by cutting it out, and then I assort the meat into First, such meat as is entirely free from fat; and Second, such meat as contains single cells of fat, such cells being scattered throughout the whole piece, so that their removal becomes impracticable.

The first class will give a preparation of better quality than the second.

The meat is then cut into pieces about one inch wide, and a half inch thick, and placed on hurdles, which are brought into a drying-room or oven provided with a good draught, and so constructed that the temperature therein can be regulated and kept below 140° Fahrenheit.

After twenty-four hours the meat loses considerable of volume, and it becomes dry, so that it can be readily pulverized. I then pass it through a mill and reduce it to a fine powder, and in this state it is capable to withstand the changes of temperature and climate. It is but very little hygroscopic, and can be kept in jars of ordinary construction.

By drying it at a temperature below 140°, the albumen, fibrin, and other like substances contained in the meat remain soluble in the acids of the stomach, and my prepared meat, therefore, remains easily digestible; in fact, on account of its finely divided state, it is even more easily digested than fresh meat. It can be used for soup, or, when moistened with water, for various dishes. It has no disagreeable taste, and it forms the most concentrated nourishment for the human body.

My meat-powder, therefore, is particularly adapted as a nourishment in cases of consumption, and all other cases of debility where it is requisite to provide the body of the sick with a surplus of nourishment, and it is particularly adapted for the use of armies, and on sea-going vessels.

What I claim as new, and desire to secure by Letters Patent, is—

The within-described process of preparing meat for preservation and nourishment, by first freeing it from fat, then drying it in a suitable oven or kiln, at a temperature below 140°, and, finally, reducing it into a fine powder, all as herein set forth.

Also, meat-powder, prepared as herein described.

H. ENDEMANN, M. D.

Witnesses:
W. HAUFF,
E. F. KASTENHUBER.